UNITED STATES PATENT OFFICE.

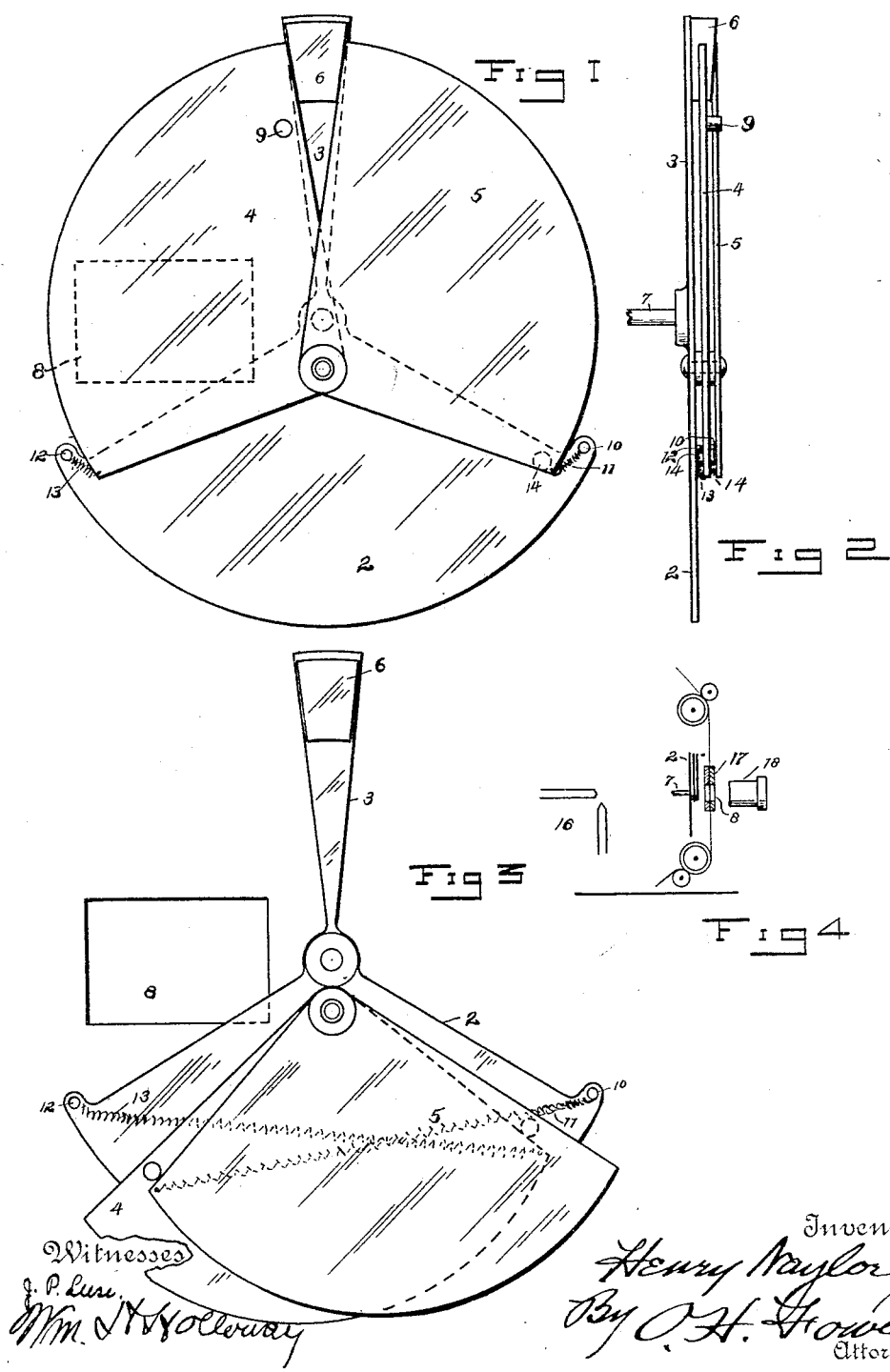

HENRY NAYLOR, JR., OF KENILWORTH, DISTRICT OF COLUMBIA, ASSIGNOR TO GROSVENOR D. W. MARCY, OF DORCHESTER, MASSACHUSETTS.

SAFETY-SHUTTER FOR KINETOSCOPES.

No. 905,910.　　　Specification of Letters Patent.　　　Patented Dec. 8, 1908.

Application filed December 12, 1907. Serial No. 406,216.

*To all whom it may concern:*

Be it known that I, HENRY NAYLOR, Jr., a citizen of the United States, residing at Kenilworth, in the District of Columbia, have invented certain new and useful Improvements in Safety-Shutters for Kinetoscopes, of which the following is a specification.

The invention relates to certain new and useful improvements in kinetoscopes and more particularly to a novel automatically operating device to cut off the projecting light from the film whenever the speed of the machine drops below a certain predetermined point.

Heretofore various devices have been used which involve a separate protecting screen and centrifugal or pneumatic mechanisms to operate the same. In most cases this protecting screen has been mounted on the back of the kinetoscope and is the way of the usual hinged gate and the mechanism of which is accessible from the back of the machine. In other cases the screen has been mounted on the hinged gate and this necessitates a complicated connection with the driving mechanism, as will be obvious.

My invention consists in mounting the usual kinetoscope shutter between the source of light and the film and providing the shutter itself with auxiliary blades which cut off the light when the speed of the machine drops below the safe point.

Reference is to be had to the accompanying drawing in which the same reference characters are used to designate like elements in the various views.

Figure 1 is a face view of an ordinary form of shutter equipped with my safety device, the shutter being shown at rest. Fig. 2 is an edge view, looking from the left of Fig. 1. Fig. 3 is similar to Fig. 1 except that here the shutter is represented as in motion. Fig. 4 shows the relative arrangement of the source of light, shutter and film.

In the drawing my safety device is shown applied to an ordinary form of shutter comprising a large section 2, to cover the film when it is intermittently fed, and a narrow sector 3, to flick across the film while at rest. This shutter is mounted on the shaft 7 which is driven from the film feeding mechanism of the kinetoscope.

Eccentrically mounted upon the large sector are the two auxiliary blades 4 and 5 of such shape as to fill the area not covered by the blades of the shutter proper and form, with the sectors 2 and 3, a complete opaque disk.

Upon blade 3 is fixed a counter weight 6, for the blades 5 and 4 which also acts as a stop to limit the motion of these blades due to the springs 11 and 13, attached to the sector 2 at 10 and 12 respectively, and to the blades 5 and 4.

14 is a stop located on the sector 2 coöperating with the blade 4 and 9 a stop located on blade 4 coöperating with blade 5.

8 represents the display or projection aperture of the kinetoscope and is located in the film guide plates 17 shown in Fig. 4.

16 represents a source of light and 18 the projecting lenses.

In operation the sectors 4 and 5 are thrown by centrifugal force behind the sector 2, such movement being opposed by the springs 13 and 11, leaving the effective area, of the shutter the same as if the auxiliary blades did not exist. As the machine slows down the pull of the springs gradually overcomes the centrifugal force developed by the auxiliary blades and they are returned to the position shown in Fig. 1 thus effectively cutting the light off.

It will be clear that my invention is not dependent upon the particular form of shutter illustrated but might well be applied to any shutter commonly used with kinetoscopes.

Having described my invention what I desire to claim is—

1. In a kinetoscope, the combination of a plate provided with a display aperture and means for feeding a film across the same, with a flat rotating shutter and a source of light, said shutter being composed of relatively movable blades and means whereby said blades, on slow rotation of the shutter form a complete opaque disk.

2. In a kinetoscope, a rotating shutter, comprising in area less than a whole circle and blades centrifugally operated to complete the area of a whole circle.

3. In a kinetoscope, a rotating shutter comprising in area less than a whole circle and blades eccentrically mounted and adapted on rotation of the shutter to complete the area of a whole circle.

4. In a kinetoscope, a flat rotating shutter, a source of light and means to guide a film, said shutter provided with means to cut off said light from said film when the shutter is at rest.

5. In a kinetoscope, a flat shutter rotating on a horizontal axis, a source of light and an element provided with a film projection aperture, said shutter being located between the source of light and the film projection aperture and provided with means to cut off the light entirely from the film when the shutter is at rest or rotating slowly.

HENRY NAYLOR, Jr.

Witnesses:
J. PERLEY LEESE,
WM. H. HOLLOWAY.